United States Patent Office 3,446,598
Patented May 27, 1969

3,446,598
CHORIONIC GONADOTROPIN SEPARATION PROCESS
John Menley Yoder and Ernest Clarence Adams, Jr., Elkhart, Ind., assignors to Miles Laboratories, Inc., Elkhart, Ind., a corporation of Indiana
Filed Dec. 22, 1966, Ser. No. 603,914
Int. Cl. B01d 15/08; A61k 23/00
U.S. Cl. 23—230                    7 Claims

ABSTRACT OF THE DISCLOSURE

A process for separating a single antigenic substance associated with the state of pregnancy from an impure chorionic gonadotropin preparation when supported on an adsorbent material in slurry form contained in a chromatographic column wherein the adsorbent material is eluted with at least two sodium phosphate buffers to recover a partially purified fraction and then eluting that fraction when supported on a second adsorbent material first with a sodium phosphate-sodium chloride buffer and thereafter with a sodium hydroxide solution.

---

This invention relates to a chromatographic process for separating a single antigenic substance associated with the state of pregnancy from an impure mixture of human chorionic gonadotropin and contaminant proteins. More particularly, it relates to a separation process including an initial chromatographic step to isolate a partially purified fraction from the original impure mixture and a subsequent rechromatographic step to complete the separation of a single antigenic substance.

A highly purified human chorionic gonadotropin (HCG) substance consisting of a single antigenic substance is of interest in the preparation of tests by which the absence or the presence of a state of pregnancy can be detected. In addition to pregnancy, HCG levels in one or more body fluids are altered by the presence of hydatidiform moles and various trophoblastic tumors.

The presence of HCG in body fluids has been commercially detected by two general types of immunological tests. The first is known as an agglutination test and is conducted in an aqueous medium using an indicator particle which is sensitized by HCG together with the antibody to HCG (HCG-Ab). Adequate agglutination type tests can be produced if either the HCG or its antibody is from a partially purified fraction as hereinafter disclosed.

The second type of immunological test is known as an Ouchterlony gel diffusion test and is conducted in a semi-solid gel using HCG-Ab to test for the presence of HCG in body fluid samples. For the successful commercial employment of this latter type of test it is necessary to use a purified HCG-Ab preparation since an impure preparation contains contaminating antibodies which cause false precipitin lines to appear in the gel layer used in such test. These false lines obscure the true precipitin lines and in many cases render the test result unusable. Even highly skilled observers are often unwilling to make a definite conclusion of the presence of a state of pregnancy when such false lines are present. The HCG-Ab preparations for such tests have been heretofore produced by injecting animals with an impure HCG preparation containing normal urine proteins in addition to the HCG and recovering the resulting antiserum which is then purified by mixing the same with normal urine concentrates to precipitate the therein contained antibodies to the normal urine proteins. This procedure does not produce useful amounts of HCG-Ab in some animals since the normal urine proteins in the impure HCG preparation block formation of the desired HCG-Ab. Another inherent limitation is that the multiplicity of steps limits the usefulness of this procedure.

Thus, the separation of a highly purified fraction from HCG preparations is important in order to provide a single pregnancy-related antigenic substance which can be used to produce HCG-Ab for use in an Ouchterlony test device wherein results free from false lines can be obtained.

None of the prior art processes for purification of chorionic gonadotropin has easily accomplished the specific purpose of separating a purified fraction containing only a single pregnancy-related antigenic substance from an impure HCG preparation. Impure preparations of the type used as the starting material in this improved purification process contain contaminant proteins as a result of the method used for collection of the chorionic gonadotropin. HCG is often obtained by concentration from pregnancy urines by first contacting the urine samples with benzoic acid, kaolin or "Permutit," a tradenamed artificial zeolite manufactured by the Permutit Co., New York, N.Y., to adsorb HCG thereon after which the HCG is removed and purified by an ethanol extraction. The resulting solute is dried and shipped in powder form. Obviously, such a non-specific chemical recovery process, which involves processing large quantities of urine, does not exclude the adsorption and later precipitation of both normal and abnormal urine contaminants present in the particular urine samples. These contaminant proteins have, in the past, been partially removed by such processes as adsorption with kaolin and re-extraction with various solvents or by use of column chromatography. Rene Got, These de Sciences, Paris (1959), has described a multi-step purification process of this type and reported the isolation of a single immunological material thereby; however this process has not been widely adopted, possibly because of its complexity.

These recovery processes have also been used with generally greater success for recovery of HCG from sources having known high activity, such as urine from choriocarcinoma patients or extracts of HCG producing moles.

The reported experiences of others indicates that the column chromatography purification processes have been found to be insufficient, by themselves, to produce a purified fraction containing only a single antigenic substance from pregnancy urines. It has always been necessary to use such column chromatography processes in conjunction with other adsorption techniques in order to separate the contaminant proteins. Hamashige, S. and Arquilla, E. R.: Immunologic and Biologic Study of Human Chorionic Gonadotropin, Journal of Clinical Investigation, vol. 43, No. 6, 1964, pages 1163–1174 set out such a column chromatography method using a tris(hydroxymethyl)aminomethane buffer with a varying sodium chloride concentration gradient. However, in order to remove contaminant antibody proteins from the antisera produced by injection of an impure HCG fraction it was necessary to first mix the antisera with normal urine concentrates in the manner above-described. Hence, this column chromatography process using the tris buffer did not provide separation of the contaminant proteins from the pregnancy specific HCG. This result is believed to be due to the use of the continuous saline gradient.

More recently, it has been found that crude HCG preparations can be purified by column chromatography in a manner which affords sufficient separation of the contaminant proteins from the HCG preparation to produce a partially purified fraction having two pregnancy-related components and two normal urine contaminants. Antisera to this partially purified fraction, while sufficiently pure for an agglutination type test, cause false precipitin lines when used in Ouchterlony tests.

It is accordingly, an object of this invention to provide a simple separation process for recovering from an impure HCG-containing preparation a single antigenic substance associated with the state of pregnancy which can be used to produce HCG-Ab which can be employed directly in Ouchterlony tests and does not cause formation of false precipitin lines.

Another object of the present invention is to provide a process conducted in chromatographic columns in which a partially purified HCG fraction is recovered from a slurry of adsorbent material having an impure HCG-containing preparation adsorbed thereon by sequential elution with sodium phosphate buffers and then adsorbing said fraction on a second adsorbent material in slurry form contained in a separate column and eluting with a sodium phosphate-sodium chloride buffer and then with a sodium hydroxide solution which removes a single antigenic substance.

Briefly described, the separation process includes the preliminary step of adsorbing onto an adsorbent material having diethylaminoethyl groups attached thereto an impure mixture of a single antigenic substance associated with the state of pregnancy and contaminant proteins. The subsequent steps are sequentially eluting the adsorbent material with at least two sodium phosphate buffers the second and any subsequent buffers of which have higher molarity than each of their next preceding buffers, thereafter contacting a second adsorbent material having diethylaminoethyl groups attached thereto with the eluate from at least one of the elutions from said buffers other than the first thereof, and then eluting the second adsorbent material first with at least one sodium phosphate sodium chloride buffer and then with an aqueous sodium hydroxide solution, neutralizing the alkaline eluate therefrom as it appears, and then drying the neutralized eluate under non-denaturing conditions to recover said single antigenic substance.

Generally, the above-mentioned adsorbent material comprises a slurry of a cellulose or a dextran gel having the diethylaminoethyl groups attached thereto (DEAE-cellulose or DEAE-dextran gel) and the impure mixture is a HCG-containing preparation and is adsorbed on said adsorbent material in a concentration of less than about 50 mg. per gram of said adsorbent material as measured in its hydroxyl form. The two sodium phosphate buffers each have a molarity within the range of about from 0.004 molar to 0.02 molar and a pH within the range of about from pH 6.2 to pH 7.1. If, as preferred, less than about 25 mg. of the impure HCG preparation per gram of adsorbent material is adsorbed, the molarity can be within a broader range of about from 0.004 molar to 0.05 molar and the pH can be within the broader range of about from pH 5.8 to pH 7.1. The first buffer can be of the same molarity and pH as the buffer in which the adsorbent material is suspended and this first buffer provides the function of removing a first fraction of contaminant proteins which are believed to be entrained in or are loosely adsorbed on said material. The second buffer elutes a partially purified fraction of HCG and leaves a second and larger fraction consisting mainly of contaminant proteins attached to the adsorbent material.

The eluate from the second buffer containing the partially purified fraction then contacts the second adsorbent material which consists of DEAE-cellulose in order to readsorb the partially purified fraction thereon. This prepared second adsorbent material is then eluted with the sodium phosphate-sodium chloride buffer which has a phosphate molarity of less than about 0.5 molar and a pH of at least pH 4.4 and a sodium chloride concentration of at least 1.5 M, the amount of buffer used being sufficient to remove substantially all of the contaminant protein from the adsorbed, partially purified HCG fraction. If desired, a series of sodium phosphate buffers having molarities of less than about 0.5 molar and pH's of at least pH 4.4 may be applied in order of increasing molarities preceding the addition of the sodium chloride containing buffer to remove the contaminant proteins in serial fashion. Thereafter the second adsorbent material is contacted with the aqueous sodium hydroxide solution in an amount sufficient to effect removal therefrom of a single antigenic substance. Preferably, the slurries of the first and second adsorbent materials are disposed within separate chromatographic columns and the optical densities of the eluates are measured by absorption at a wavelength of about 190 m$\mu$ to 240 m$\mu$.

The following detailed description and example will be more clearly understood by reference to the attached drawings in which.

Figure 7:
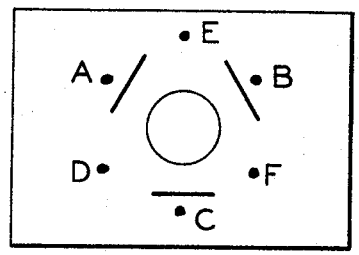
Figure 8:
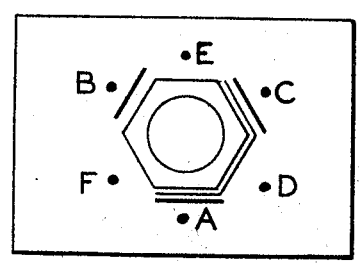

FIGURE 7 is a schematic representation of the result of an Ouchterlony test performed with a center of the antisera produced from the single antigenic substance obtained by the process of the present invention, the surrounding spots A, B and C being of a pregnancy urine concentrate, and the surrounding spots D, E and F being of a normal urine concentrate; and FIGURE 8 is a schematic representation of the result of an Ouchterlony test performed with a center of the antisera produced from the partially purified fraction, the spots A, B and C being of a pregnancy urine concentrate, and the spots D, E and F being of a normal urine concentrate.

Figure 1:
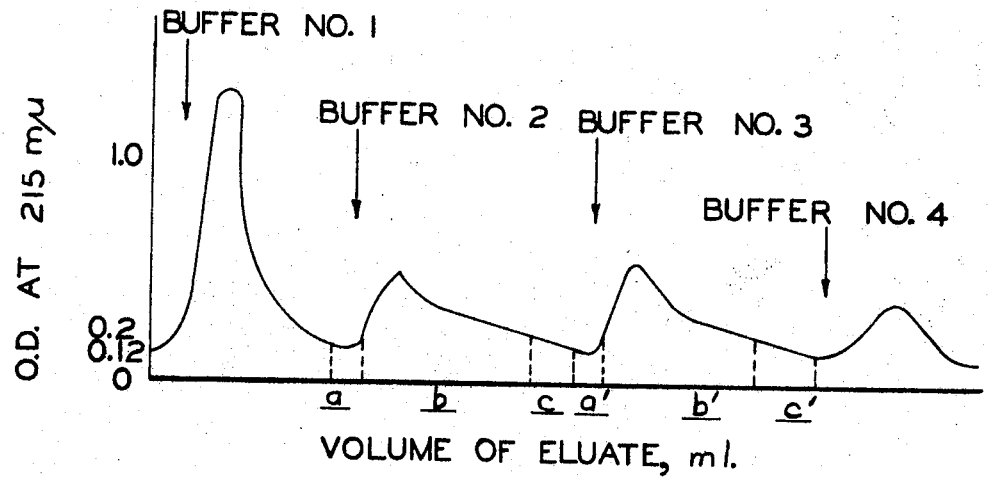
FIGURE 1 is a graph showing the volume of each of the serially collected eluates from the first adsorbent material plotted against the optical densities of said eluates.

Referring more particularly to FIGURE 1, the optical density curve shown is the result of continuously monitoring the optical density (O.D.) of the various eluates from the first adsorbent material on which an impure HCG preparation is adsorbed. The optical densities were measured by a continuously recording spectrophotometer set for recording at 215 m$\mu$. The adsorbent material used may be either DEAE-cellulose or DEAE-dextran gel and it is usually washed with Buffer No. 1 to bring it into ionic equilibrium therewith and then suspended in a sufficient amount of that same buffer to make up a slurry concentration of about 60 mg. adsorbent material/ml. packed volume. The slurry is then poured into a chromatographic column and a solution of an impure HCG preparation is passed through the column in order to adsorb the proteinaceous matter thereof on the adsorbent material. Thereafter sodium phosphate Buffers No. 1, No. 2, and if desired, No. 3, are sequentially run through the column and the eluates therefrom are collected in a number of test tubes. While the entire eluate volume from Buffer No. 1 is usually collected in a single container it is preferred to collect the eluate from Buffer No. 2 in a series of containers so that those portions having O.D. values above about 0.2 O.D. can be separately isolated since the greatest amount of the partially purified fraction and hence the highest concentration thereof is found in those portions. The eluate from Buffer No. 3 is also collected in a series of containers for the same purpose.

Buffers No. 1, No. 2 and No. 3 have molarities (M) within the range of about from 0.004 M to 0.05 M and pH's within the range of about from pH 5.8 to pH 7.1 for a loading factor of less than about 25 mg. HCG per gram of adsorbent material, with Buffer No. 2 having a higher molarity than Buffer No. 1 and Buffer No. 3 having at least as high molarity as Buffer No. 2. However, if a loading factor of about from 25 to 50 mg. HCG per gram of adsorbent material is used, the upper limit for molarity is about 0.02 M and the lower limit for pH is about pH 6.2. The volumes of each of the buffers employed are sufficient to elute substantially all of the proteinaceous matter which can be eluted with each particular buffer as hereinafter detailed.

It is also possible to use for an initial buffer one having lower molarity than the above range if its molarity is less than about 0.004 M and its pH is greater than about pH 7.1 without eluting any significant amount of the adsorbed impure mixture.

The molarity of the second and subsequent buffers employed may be close to and only slightly higher than the molarity of their next preceding buffers. It is possible for them to have nearly the same pH so long as the molarity is higher. For example, molarity increases should be sufficient to elute at least about 2 mg. of the partially purified fraction from the adsorbent material after each of the preceding fractions thereof have been eluted by the preceding buffer. If desired, a large number of buffers within the above molarity and pH ranges can be employed so long as the molarities are chosen close together in a sequential fashion.

After the adsorbent material suspended in the chromatographic column has been loaded with the impure HCG preparation, Buffer No. 1 is continuously added to the top of the column and the eluate drained from the bottom and its O.D. continuously monitored as above-mentioned. The first peak of the curve shown in FIGURE 1 is described by the instrument chart, and, when the curve has risen through a maximum and has decreased to approximately the O.D. of the initial Buffer No. 1 or about 0.12 O.D., addition of this buffer is terminated, and Buffer No. 2 is added to the column in a similar manner. The eluate from Buffer No. 2 is also continuously monitored and the O.D. curve also rises through a maximum and then decreases to about the O.D. of the fresh Buffer No. 2, as shown by the second peak of FIGURE 1. The addition of the second buffer is then terminated and Buffer No. 3 is passed through the column in an amount sufficient to allow the recorded O.D. curve to pass through a maximum and then to decrease to the O.D. of the initial Buffer No. 3.

The eluates from Buffers No. 2 and No. 3 contain the partially purified fraction which is used to load a second portion of adsorbent material for the rechromatographic step. As stated above those portions of the eluates having O.D. values above 0.2 O.D. are collected separately. This is easily accomplished by collecting the eluates in a series of containers whereby a first portion having a low O.D. value as shown by section $a$ of the graph can be separated from a second purer portion having the highest average O.D. value as shown by section $b$ of the graph. After the second and more concentrated portion of the eluate has passed from the column a third portion of lower O.D. value, denoted by section $c$ is collected. The same method can be employed for the eluate from the third buffer in order to separate a portion $b'$ from portions $a'$ and $c'$. In this manner, more highly concentrated partially purified fractions are available for use for the subsequent rechromatographic step. Since this fraction is in Buffer No. 2 or Buffer No. 3 or a mixture thereof and it is often desired to load it onto the second chromatography column in Buffer No. 1, the fraction may be taken up in Buffer No. 1 by first dialyzing the eluate into distilled water and then into the Buffer No. 1.

The buffers for the initial chromatographic purification are prepared by mixing together appropriate amounts of solutions of mono-hydrogen orthophosphate ($Na_2HPO_4$) and dihydrogen orthophosphate ($NaH_2PO_4 \cdot H_2O$). Amounts of each of the solutions of proper concentration are admixed to attain the desired molarity and pH.

The ranges of molarity and pH which are preferably employed with loading factors of less than about 25 mg. of HCG preparation per gram of adsorbent material for the first and second buffers are as follows:

Buffer No. 1: Molarity—about 0.004 M to about 0.006 M; pH—about pH 6.8 to pH 7.1.

Buffer No. 2: Molarity—about 0.007 M to about 0.04 M; pH—about pH 5.9 to about pH 6.8.

For loading factors of less than about 25 mg. of impure HCG preparation per gram of adsorbent material it is preferred to utilize a third sodium phosphate buffer having a molarity and a pH within the broad ranges above set out and a molarity higher than the molarity of the second buffer in order to elute an additional amount of the partially purified HCG fraction from the cellulose. In this manner an additional quantity of the partially purified fraction may be recovered by performing only a single additional elution step. The molarity and pH of this third sodium phosphate buffer preferably varies between the following limits for loading factors less than about 25 mg. of HCG preparation per gram of adsorbent material:

Buffer No. 3: Molarity—about 0.04 M to about 0.05 M; pH—about pH 5.8 to about pH 5.9.

After the second and any subsequent partially purified fractions have been eluted from the cellulose a fourth sodium phosphate buffer which functions as a cleaning buffer can be used, to remove most of the remaining adsorbed contaminant protein from the adsorbent material so that the column can be used continually. The O.D. of the resulting eluate is continuously monitored and the curve thereof is shown in FIGURE 1. The molarity and pH of this cleaning buffer may vary widely. Generally the molarity must be greater than about 0.1 M and the pH must be lower than about pH 5.8. For example the fourth buffer, may have values in the following range.

Buffer No. 4: Molarity—about 0.1 M to about 0.4 M; pH—about pH 4.4 to about pH 5.8.

To insure that all of the contaminant protein is removed as well as to allow analysis of the contaminant protein in fractionated samples a series of cleaning buffers having molarities and pH's within the above range can be employed to serially elute various groups of contaminant proteins. For example, the first of these cleaning buffers may have a molarity of about 0.1 M and a pH of about 5.8, and a second cleaning buffer can have a molarity of about 0.4 M and a pH of about 5.2. The eluate from the cleaning buffers can be collected in a single vessel or a series of vessels for analytical work.

To insure that the cellulose is completely free of any contaminant materials 1 normal (N) sodium hydroxide solution may then be run through the column until no protein is eluted.

Figure 2:
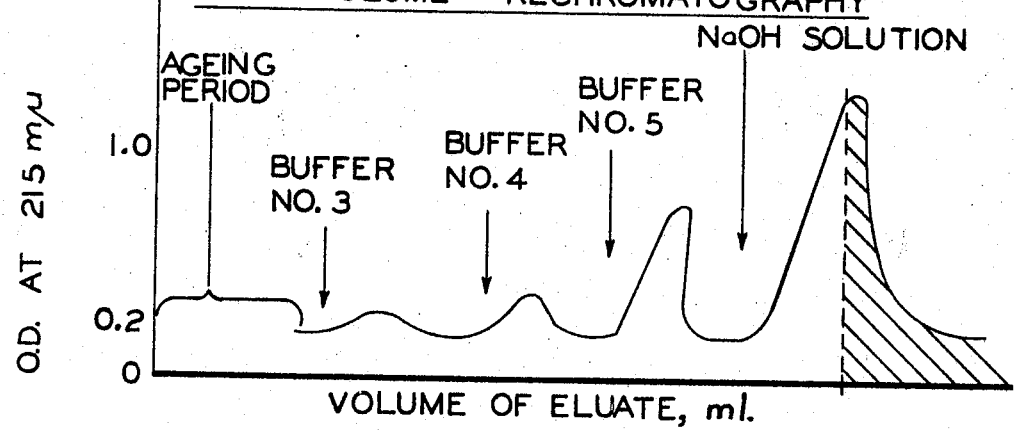
FIGURE 2 is a graph showing the volume of each of the serially collected eluates from the second adsorbent material plotted against the optical densities of said eluates.

The partially purified fraction recovered from the eluates of Buffer No. 2 and/or Buffer No. 3 is readsorbed onto a second adsorbent material suspended as a slurry in a second column. As mentioned above, it is preferred to make a solution of the partially purified fraction in a small quantity of Buffer No. 1. Preferably the loading factor is about from 0.17 to 1.2 mg. of the partially purified fraction per gram of said adsorbent material measured in its hydroxyl form. A higher loading factor, approaching the loading factors employed for the initial chromatographic separation, can be used but the recovery efficiency is not aided thereby. After the partially purified fraction has been adsorbed onto the adsorbent material it is allowed to age for a period of from about one and one-half to two hours as shown in FIGURE 2 in order to obtain higher efficiency of recovery. During this aging period there is no flow through the column.

As a preferred preliminary treatment several of the above-mentioned buffers are then sequentially run through the second column to remove any proteinaceous matter which was not removed by those buffers when previously employed. With continuous monitoring of the O.D. of the eluate, Buffer No. 3 is put through the column until the O.D. curve rises through a maximum and has decreased to approximately the O.D. of this buffer in a fresh state. A slight hump in the curve of FIGURE 2 is seen, indicating that only a small quantity of contaminant material is eluted by this buffer. Next Buffer No. 4 is continuously added in the same manner and a peak in the O.D. curve is seen. If desired these two buffers may be replaced by any number of sodium phosphate buffers having molarities within the range of about from 0.005 M to 0.5 M and pH's within the range of about from pH 4.4 to pH 7.0.

The first buffer for the rechromatographic step is a buffer having a phosphate molarity of not greater than about 0.5 M and a pH of at least about pH 4.4 and containing sodium chloride in a concentration of at least 1.5 M. In FIGURE 2 this buffer has been referred to as Buffer No. 5. This buffer is passed through the column and a sharp rise and a fairly high peak in the O.D. curve of FIGURE 2 is seen following addition of Buffer No. 5. As with the other buffers, a sufficient amount is employed to allow the O.D. to rise through a maximum and decrease to approximately the O.D. of the fresh buffer.

Preferred ranges of molarity, pH and the minimum sodium chloride concentration for the necessary buffer used in the rechromatographic step are:

Buffer No. 5: Phosphate molarity—about 0.2 M to about 0.5 M; pH—about pH 4.4 to about pH 5.8; NaCl concentration—at least 1.5 M.

Generally the higher molarities and lower pH's are preferred. Particularly preferred are the conditions of about 0.5 M phosphate molarity, about pH 4.4 and about 2 M sodium chloride concentration.

Thus, Buffers Nos. 3, 4 and 5 have phosphate molarities not greater than 0.5 M and pH's of at least pH 4.4 and function to remove additional contaminant proteinaceous matter during the rechromatographic step.

The final liquid applied to the column is an aqueous sodium hydroxide solution which is preferably about 1 N in concentration, although a wide range of concentrations is usable. Unexpectedly, it is found that the sodium hydroxide solution removes a large fraction of proteinaceous matter as seen by the last peak in the curve of FIGURE 2 which is a single antigenic substance associated with the state of pregnancy. While this pregnancy-related substance has high immunochemical purity, its biological activity, and its classification as the hormone HCG, has not been adequately established by exhaustive biological tests.

Due to the high pH of this sodium hydroxide solution which rapidly denatures protein, the eluate is immediately neutralized in a continuous fashion as it appears. If desired, a series of small containers can be used for collection of the eluate in the manner described above, as this allows for more rapid neutralization of the eluate. Generally the substance must be removed from the eluate liquid in order to be useful in further work and for construction of Ouchterlony tests. Therefore, the neutralized eluate is dialyzed against distilled water after which the liquid is removed under non-denaturing conditions to recover a dried product.

The success of the rechromatographic separation depends in large part upon the removal of remaining contaminant proteinaceous matter from the protein mixture contained in the eluates of the second and third buffers from the initial chromatographic step. An unexpected finding of the present process is that Buffers Nos. 3, 4 and 5 do not elute substantial amounts of the purified pregnancy-related antigenic substance when used during the rechromatographic step, but rather elute the previously chromatographically similar contaminant proteins. The chromatographic closeness of these two protein substances is illustrated by the fact that they are both recovered in the eluates of Buffers Nos. 2 and 3.

Figure 3:
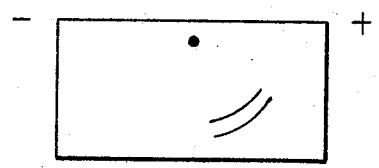
FIGURE 3 is a schematic representation of the immuno-electrophoresis pattern obtained by reacting the antisera produced from the partially purified fraction against a spot of normal urine concentrate.
Figure 4:
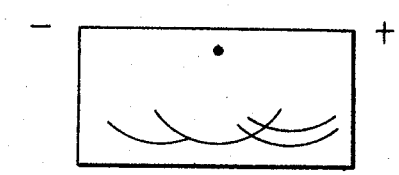
FIGURE 4 is a schematic representation of an immuno-electrophoresis pattern obtained by reacting the antisera produced from the partially purified fraction against a spot of pregnancy urine concentrate.

The immuno-electrophoretic pattern shown in FIGURE 3 resulted from placing a small quantity of a normal urine concentrate, i.e., a non-pregnancy urine, in the spot shown, which in actual testing is an open circle in an otherwise continuous film of semi-solid gel supported on a glass plate. The right hand edge of the gel is held positive and the left hand edge charged negative according to standard electrophoretic practice. Then rabbit antisera to the partially purified fraction is recovered directly from the animal and placed along the lower edge of the gel. The two arcuate lines found indicate that the partially purified fraction from which the antisera was made contains two different protein substances which are also present in normal urines and therefore are proteins which are not associated with pregnancy. FIGURE 4 shows the pattern obtained from a similar electrophoretic test carried out with a spot of pregnancy urine concentrate. Two additional arcuate lines are formed, one of which intersects the precipitin lines formed by the two non-pregnancy proteins. Hence, it may be concluded from FIGURE 4 that the antisera to the partially purified fraction contains four antibody types, two specific for pregnancy, and two non-specific.

Figure 5:
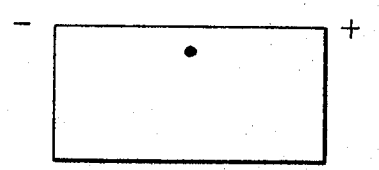
FIGURE 5 is a schematic representation of the absence of an immuno-electrophoresis pattern obtained by reacting the antisera produced from the single antigenic substance recovered by the present invention against a spot of normal urine concentrate.
Figure 6:
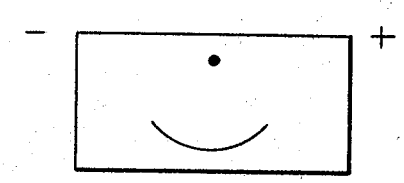
FIGURE 6 is a schematic representation similar to FIGURE 5 with the exception that the spot shown is of pregnancy urine concentrate.

The pattern shown in FIGURE 6 indicates that when comparative tests are carried out with the rabbit antisera to the protein substance isolated from the neutralized NaOH eluate only a single line is found when testing with a spot of pregnancy urine concentrate. This indicates that the rechromatography step has separated the contaminant protein substances from the single antigenic substance which is associated with a state of pregnancy. From FIGURE 5 it can be seen that there is no significant antibody which reacts with proteins present in a spot of normal urine concentrate in the antisera produced from the purified fraction. Thus it is concluded that the purified HCG fraction separated from the original impure preparation contains only a single antigenic substance which is associated with a state of pregnancy. By comparison between FIGURES 4 and 6 it can be seen that this single antigenic substance is positionally similar to the dominant precipitin line representing the pregnancy-specific protein present in the partially purified fraction.

The purified fraction separated by the present process is particularly useful for the construction of Ouchterlony gel diffusion tests as shown in FIGURE 7 wherein spots of specimens to be tested are positioned in a circular pattern about a centrally located opening in a thin gel layer supported on a glass slide. The central opening in the gel is filled with rabbit antisera to the purified fraction and spots of the specimens to be tested are placed in the spots distributed about the central opening. The proteins in the specimens and those in the antisera then diffuse through the gel layer and when an antigen protein reacts with its antibody a relatively stationary aggregate is formed which does not further diffuse. The aggregates formed are then seen by the formation of precipitin lines made up of such aggregates. In FIGURE 7 pregnacy urine concentrates were added to the gel layer at the spots marked A, B and C for which the lines produced allowed a definite conclusion as to the source of the concentrates employed. The absence of lines near spots D, E and F shows that the concentrates added to those spots were from normal urines. Thus for testing a patient's urine specimen all that is necessary is to place a spot of the concentrated specimen on a prepared Ouchterlony gel plate which has been constructed with an opening filled with the antisera to the purified fraction. If a precipitin line appears, the specimen contains a pregnancy associated antigenic substance and a conclusion of pregnancy can be made. If the specimen does not contain the pregnancy associated antigenic substance no line will appear and a conclusion of no pregnancy can be made.

The difficulty in conducting a similar Ouchterlony test with the antisera to the partially purified fraction recovered from the initial chromatographic step is seen in FIGURE 8 wherein the same concentrates were used for each of the marked spots as were used for the gel plate illustrated by FIGURE 7. Two lines are seen between spot B and the central opening, while two lines are also seen between spot D and the central opening. The first spot, B, is formed by a pregnancy urine concentrate while the second spot, D, is formed by a normal urine concentrate. If the other lines were not present in the gel layer it would be virtually impossible to decide which of the spots B or D contained the pregnancy urine concentrate. The presence of the other lines results in the formation of a hexagonal pattern due to the presence of some normal urine proteins in each of the concentrates. While this pattern is of some value in judging relative positions in order to draw conclusions of the test results, such judging requires a high skill level and the additional reagents necessary to provide such a pattern raises the cost of such a gel plate beyond that which is commercially acceptable.

The loading of the DEAE-cellulose or DEAE-dextran gel for the initial chromatographic step is accomplished by dissolving a predetermined amount of an impure HCG preparation in several ml. of Buffer No. 1 and applying the resulting solution to the slurry in the first column. The HCG solution may be applied directly, or if desired, it may be optionally dialyzed or filtered in order to remove some of the entrained small molecular impurities. Dialysis is carried out by dialyzing the HCG solution against Buffer No. 1 and the more preferred pretreatment of filtration of the HCG is accomplished by dissolving the quantity to be used in several ml. of Buffer No. 1 and passing the solution through a column containing a modified dextran gel obtained by fermentation of sugar. A filtration material of this type is marketed by A. B. Pharmacia, Uppsala, Sweden, under the trade name Sephadex G–25 and has a particle size of 20–80 microns and a packing density of 0.2 g. per ml. in a suspending liquid. The modification of the sugar by fermentation results in cross-linking of the particles at the 1–6 linkages of the polysaccharide molecules.

The eluate recovered after filtration through the dextran gel column contains approximately 95% of the original HCG material. The useful portions of the eluate are determined by monitoring the eluate at 215 m$\mu$. Those portions of the eluate which have optical densities greater than about 0.1 are used for adsorption onto the adsorbent material in the column.

The filtered HCG preparation then consists of nearly the same amount of HCG preparation as originally present but now dissolved in about 10 ml. of Buffer No. 1. This solution is applied to the DEAE-cellulose or DEAE-dextran slurry contained in the chromatographic column. The HCG solution is applied in a limited amount so that a loading factor of less than about 50 mg. HCG/g. of adsorbent material or 3.0 mg. HCG/ml. packed column volume both measured on the basis of the hydroxyl form of the adsorbent material is attained.

For purposes of this invention the impure HCG preparation can be obtained from any of the readily available commercial sources such as Mann Research Laboratories, Inc., New York, N.Y.; Vitamerican Corp., Little Falls, N.J.; and Leo Corp., Halsingborg, Sweden. These materials may vary markedly in specific activity, from 200 to 6500 international units per mg. In general, any of the commercially available HCG preparations or any extracts prepared from HCG containing fluids can be employed for the present separation process with similar results.

The loading of the HCG preparation onto the DEAE-cellulose or DEAE-dextran in a proportion of less than about 50 mg. impure HCG per gram of said adsorbent material is much lower than the loading in most chromatographic columns. In this manner greater sensitivity for separation can be achieved with the result that the partially purified fraction recovered is a highly purified preparation from which a single antigenic substance can be isolated by the rechromatographic step.

The volume of the first buffer used in the purification process must be sufficient to elute a large percentage of the loosely bound protein contaminants from the adsorbent material. This volume of buffer depends upon the total amount of HCG preparation used for loading of the column, and hence, depends upon the size of the chromatographic column. The most practical manner of determining the necessary volume is to apply Buffer No. 1 to the column and continuously measure the O.D. of the eluate. The curve established rises to a maximum and then decreases to a value which approximates the O.D. of pure Buffer No. 1 as shown by the curve following addition of Buffer No. 1 in FIGURE 1. Continuous addition of any significant volume of Buffer No. 1 past this O.D. value accomplishes no useful purpose, except to assure that all of the contaminant protein which has been eluted by the first buffer is drained from the column before the second buffer is applied.

Both the initial chromatographic step and the rechromatographic step of this invention can be conducted in a batch-wise fashion by mixing the various buffers sequentially with the adsorbent material slurry and then draining the eluate from each batch mixing before contacting the cellulose with the subsequent buffer. In such case the same buffers are used and the volumes thereof are determined as for column elution. However, in order to monitor the O.D. of the eluates to determine the necessary volumes of the buffers it is preferably to divide each predetermined buffer volume into several portions so that a change in O.D. over the course of elution with each individual buffer can be easily measured.

In order to recover the partially purified fraction from impure HCG preparations at least approximately 2 mg. of the partially purified fraction should be eluted by the second buffer in order to isolate a significant amount of the single antigenic substance by the subsequent rechromatographic step. That is, the second buffer should be responsible for eluting at least about this amount of the fraction, even though a small amount of the end portion of the first eluate might still be coming off the column when Buffer No. 2 is being applied to the column. Any greater amount of Buffer No. 2 can be employed with the caution that at very great volumes no advantage will be obtained since the protein will be eluted in such small concentration as to make the continued employment of Buffer No. 2 impractical.

As stated above, it is preferred to monitor the eluates from the various treatment solutions with a spectrophotometer set at 215 m$\mu$ due to the low concentration of proteins in the eluates which is, in part, caused by the low column loading which is used to enhance the separations obtained with the various solutions. The use of each particular treatment solution is terminated when the O.D. of the eluate thereof approaches 0.12 or the O.D. of the pure buffer. A spectrophotometer set at 215 m$\mu$ is ten to twenty times as sensitive to the proteins of the present invention as one set at the more usual 280 m$\mu$. This is demonstrated by the fact that at 215 m$\mu$ an O.D. of 11.2 is recorded for 1.0 mg. HCG/ml. of Buffer No. 2, whereas at 280 m$\mu$ an O.D. of only 0.55 is recorded for a similar concentration. Generally, wavelengths of about from 190 m$\mu$ to 240 m$\mu$ provide sufficient distinction for use, particularly at higher HCG concentrations.

A preferred manner of measuring the amounts of the proteins eluted by each of the treatment solutions is to use the relationship that one (1) mg. of HCG protein is equivalent to about 10 protein units (P.U.), where P.U. is defined as the product of the volume of eluate times the average O.D. ($\overline{O.D.}$) of that volume measured at 215 m$\mu$. This may be expressed as:

$$P.U. = \text{Eluate volume} \times \overline{O.D.}$$

The above objects and detailed description will be rendered more specific to those skilled in the art by the following example in which parts and percentages are by weight and concentrations of buffers are given as molarity, M, unless otherwise specified.

EXAMPLE

| Treatment solutions: | Molarity—pH |
|---|---|
| Buffer No. 1 | 0.005 M, pH 7.0. |
| Buffer No. 2 | 0.0175 M, pH 6.3. |
| Buffer No. 3 | 0.04 M, pH 5.9. |
| Buffer No. 4 | 0.1 M, pH 5.8. |
| Buffer No. 5 | 0.4 M, pH 4.4 in 2M NaCl. |
| NaOH | 1.0 N. |

Buffer No. 1 was made up by mixing 60 volume parts of an aqueous solution containing 0.71 g. of anhydrous mono-hydrogen orthophosphate per liter with 40 volume parts of an aqueous solution containing 0.69 g. of dihydrogen orthophosphate ($NaH_2PO_4 \cdot H_2O$) per liter. The pH can be adjusted to the exact value of pH 7.0 by the addition of a small quantity of one of the solutions.

Buffer No. 2 was made up by mixing 27 volume parts of an aqueous solution containing 2.48 g. of mono-hydrogen orthophosphate per liter with 73 volume parts of an aqueous solution containing 2.42 g. of dihydrogen orthophosphate per liter. A similar pH adjustment as used for Buffer No. 1 can also be used for this buffer.

A first 2.2 cm. x 17 cm. glass column was set up with a 60 ml. suspension (packed volume) of modified dextran gel (Sephadex G-25) in Buffer No. 1. The concentration of this suspension was about 0.2 g./ml. A quantity of DEAE-cellulose was then washed with a large volume of Buffer No. 1 in order to bring it in to ionic equilibrium therewith. A first 3 cm. x 30 cm. glass column was set up and a sufficient volume of the washed DEAE-cellulose suspendsd in Buffer No. 1 was added to make 240 ml. packed column volume. About fourteen (14) g. of a DEAE-cellulose in hydroxyl form having a fiber length of between 100 to 300 microns and an adsorption capacity of 0.9±0.1 milliequivalents per gram as measured with chloride ion were employed in this column. A modified cellulose of this description is available from Carl Schleicher & Schuell Co., Keene, N.H. A quantity of 240 m.g. of an HCG preparation obtained from Vitamerican Corp. was then dissolved in about 5 to 10 ml. of Buffer No. 1.

The HCG solution was first filtered through the modified dextran column with addition of more Buffer No. 1 and the eluate monitored at 215 m$\mu$ by a spectrophotometer and collected in 20 fractions of 6 ml. volume each. Fractions 4 through 10 contained approximately 95% of the original HCG preparation and these were pooled and then applied to the DEAE-cellulose column. The amount of HCG absorbed onto the cellulose in the packed column was sufficient to give a loading factor of approximately 17 mg. of impure HCG preparation per gram of cellulose.

A number of 14 ml. fractions were drained from the DEAE-cellulose column using 1300 to 1500 ml. of Buffer No. 1 and collected in separate vessels using a Gilson fraction collector. At the end of this volume of Buffer No. 1 the O.D. monitored by the spectrophotometer set at 215 m$\mu$ was approximately equivalent to the O.D. of the buffer as freshly prepared, which O.D. value was less than 0.12 O.D. Buffer No. 1 was then terminated and the collection vessels set aside. A volume of 1600 to 1800 ml. of Buffer No. 2 was then applied to the column to elute a purified fraction and the eluate was collected in the same manner as the eluate of Buffer No. 1. When this volume had been charged through the column, the O.D. of the eluate was approximately equivalent to freshly prepared Buffer No. 2, which was below about 0.12 O.D. The 14 ml. middle fractions obtained from the eluate of Buffer No. 2 which exhibited O.D. values of above about 0.2 were then pooled, dialyzed in distilled water, and then dialyzed into Buffer No. 1 for use in the subsequent rechromatographic step. This partially purified fraction corresponds to the middle fractions denoted as fractions b in FIGURE 1.

Nine milligrams (9.0 mg.) of this partially purified fraction in about 200 ml. of Buffer No. 1 were added to a second 3 cm. x 30 cm. glass column filled with a suspension of DEAE-cellulose in Buffer No. 1 after the cellulose had been brought into ionic equilibrium therewith. The packed volume column suspension was prepared in the same manner as for the first column and was about 180 ml. This amount of the partially purified HCG fraction resulted in a loading factor of 0.85 mg./g. of DEAE-cellulose as measured in its hydroxyl form or 0.05 mg./ml. packed column volume. The column was then washed with several hundred milliliters of Buffer No. 1.

The column was then allowed to stand for 1.5 to 2 hours with no flow therethrough. This aging period allowed a greater quantity of the single antigenic substance to be ultimately recovered.

Buffer No. 3 was made up by mixing 8 volume parts of an aqueous solution containing 5.68 g. of anhydrous monohydrogen orthophosphate per liter with 92 volume parts of an aqueous solution containing 5.52 g. of dihydrogen orthophosphate per liter with a similar pH adjustment as stated for Buffer No. 1 when necessary. Buffer No. 4 was then made by mixing 8 volume parts of an aqueous solution containing 14.19 g. of anhydrous mono-hydrogen orthophosphate per liter with 92 volume parts of an aqueous solution containing 13.8 g. of dihydrogen orthophosphate per liter and adjusting to pH 5.8 with one of the solutions.

Buffer No. 5 was prepared by adding 116.9 g. of NaCl/ liter to a 0.4 M solution of dihydrogen orthophosphate and titrating this solution to pH 4.4 with an aqueous solution of 0.4 M mono-hydrogen orthophosphate to which had been added 116.9 g. of NaCl/liter. The 1.0 N NaOH solution was made in the standard manner by adding a weighted quantity of anhydrous NaOH to distilled water.

Buffer No. 3 was first applied to the DEAE-cellulose column in an amount of 200 ml. and the eluate therefrom collected in separate vessels using a Gilson fraction collector. After this volume of Buffer No. 3 had passed through the column the O.D. monitored by a spectrophotometer set at 215 m$\mu$ was approximately equivalent to the O.D. of the buffer as freshly prepared. As seen by the schematic diagram of FIGURE 2 only a slight peak in the O.D. curve was obtained. The next buffer, No. 4, was then applied to the column in an amount of 280 ml. and the eluate collected and monitored in a similar manner.

Buffer No. 5 was then applied to the column in an amount of 255 ml. and the eluate therefrom collected and monitored in the above fashion. A fairly high peak in the O.D. curve resulted as illustrated by FIGURE 2.

Thirty milliliters (30 ml.) of the NaOH solution was then applied to the column beyond the point where the eluate became alkaline and the total eluate therefrom was collected in the same manner as for the above buffers. The eluate was acidic until a fairly large amount of the solution had passed through the column. Thereafter the last portion was alkaline. This last portion was immediately neutralized to pH 4.7 to pH 7.0 with 1.0 N HCl solution as it appeared. Thereafter, the total NaOH eluate was dialyzed in distilled water and lyophilized under non-denaturing conditions to recover 5.9 mg. of solid material on a buffer-free basis. Immuno-electrophoretic and Ouchterlony gel diffusion tests indicated that this material was a single antigenic substance associated with the state of pregnancy.

In summary, the process of the present invention allows a simple and commercially feasible two step chromatographic separation of a single antigenic substance from impure commercially available HCG preparation. The purified substance can be used to construct Ouchterlony gel tests which allow non-conflicting results to be obtained.

What is claimed is:

1. The process of separating a single antigenic human chorionic gonadotropin from an impure mixture of said human chorionic gonadotropin and contaminant protetins comprising the steps of contacting an adsorbent material selected from the group consisting of cellulose and dextran gel having diethylaminoethyl groups attached thereto with said impure mixture to adsorb said mixture thereon, sequentially eluting said adsorbent material with at least two sodium phosphate buffers, the second and any subsequent buffers having higher molarity than each of their next preceding buffers, contacting a second adsorbent material selected from the group consisting of cellulose and dextran gel having diethylaminoethyl groups attached thereto with the eluate from at least one of said elutions other than the first thereof, eluting said second adsorbent material with at least one sodium phosphate-sodium chloride buffer, thereafter eluting said second adsorbent material with an aqueous sodium hydroxide solution, neutralizing the alkaline eluate therefrom as it appears, and then drying the neutralized eluate under non-denaturing conditions to recover said single antigenic substance.

2. A process according to claim 1 wherein said impure mixture is an impure human chorionic gonadotropin preparation and said adsorbent material is selected from the class consisting of cellulose and dextran gel and said impure mixture is adsorbed thereon in a concentration of less than about 50 mg. per gram of said adsorbent material measured in its hydroxyl form, wherein said sodium phosphate buffers for eluting said adsorbent material have molarities within the range of about from 0.004 M to 0.05 M and pH's within the range of about from pH 5.8 to pH 7.1 for concentrations of adsorbed impure mixture of less than about 25 mg. per gram of said adsorbent material measured in its hydroxyl form and have molarities within the range of about from 0.004 M to 0.02 M and pH's within the range of about from pH 6.2 to pH 7.1 for concentrations of adsorbed impure mixture of about from 25 to 50 mg. per gram of said adsorbent material measured in its hydroxyl form, and wherein said second adsorbent material consists of cellulose and said sodium phosphate-sodium chloride buffer for eluting said second adsorbent material has a phosphate molarity of about from 0.2 M to 0.5 M and a pH of about from pH 4.4 to pH 5.8 and has a sodium chloride concentration of at least 1.5 M.

3. A process according to claim 2 wherein the optical densities of each of said buffers and said sodium hydroxide solution are measured at a wavelength of about 190 m$\mu$ to 240 m$\mu$, and wherein each of said buffers and said sodium hydroxide solution are used in amounts at least sufficient to allow the optical densitiy of each of their respective eluates to rise through a maximum and decrease to approximately the optical density of said buffer and said sodium hydroxide solution prior to use.

4. A process according to claim 1 wherein said second adsorbent material is allowed to age for about two hours after contacting the same with the eluate from said sodium phasphate buffers and prior to the elution thereof with said sodium phosphate-sodium chloride buffer.

5. A process according to claim 1 wherein the eluate used for contacting said second adsorbent material contains a partially purified fraction of said impure mixture and an amount of said eluate is used to attain an adsorbed concentration of about from 0.17 to 1.2 mg. of said partially purified fraction per gram of said second adsorbent material measured in its hydroxyl form.

6. A process according to claim 1 wherein said second adsorbent material is eluted with at least one additional sodium phosphate buffer prior to elution thereof with said sodium phosphate-sodium chloride buffer, said additional sodium phosphate buffer having a molarity of about from 0.005 M to 0.5 M and a pH of about from pH 4.4 to pH 7.0.

7. A process according to claim 1 wherein said adsorbent materials are in slurry form and are contained in separate chromatographic columns through which said buffers and said sodium hydroxide solution are eluted.

References Cited

Hon et al., Chem. Abstr. 49, 11761c (1955).
Baker et al., Control Engineering 8, 77 (1961).
Hanashige et al., J. Clin. Invest. 43, 1163 (1964).

MORRIS O. WOLK, *Primary Examiner.*

R. M. REESE, *Assistant Examiner.*

U.S. Cl. X.R.
167—84.5; 260—112